United States Patent
Patterson et al.

(10) Patent No.: US 8,740,225 B2
(45) Date of Patent: Jun. 3, 2014

(54) HYDRODYNAMIC BORE SEAL

(75) Inventors: Curtis Patterson, Calgary (CA);
Alejandro Juan, Calgary (CA); Soheil Farshchian, Calgary (CA)

(73) Assignee: Exponential Technologies, Inc., Calgary, AB (CA)

( * ) Notice: Subject to any disclaimer, the term of this patent is extended or adjusted under 35 U.S.C. 154(b) by 698 days.

(21) Appl. No.: 12/792,162

(22) Filed: Jun. 2, 2010

(65) Prior Publication Data

US 2011/0133410 A1      Jun. 9, 2011

Related U.S. Application Data

(60) Provisional application No. 61/183,846, filed on Jun. 3, 2009.

(51) Int. Cl.
*F16J 15/447*      (2006.01)

(52) U.S. Cl.
USPC ........................................... 277/413; 277/421

(58) Field of Classification Search
USPC ......... 277/355, 345, 409, 411, 412, 413, 414, 277/415, 416, 417, 421
See application file for complete search history.

(56) References Cited

U.S. PATENT DOCUMENTS

| | | | | |
|---|---|---|---|---|
| 4,180,188 A | * | 12/1979 | Aonuma et al. | 222/368 |
| 4,579,351 A | * | 4/1986 | Daffron | 277/481 |
| 4,799,694 A | * | 1/1989 | Brauers | 277/478 |
| 5,031,922 A | | 7/1991 | Heydrich | |
| 5,042,823 A | | 8/1991 | Mackay et al. | |
| 5,108,116 A | | 4/1992 | Johnson et al. | |
| 5,695,201 A | * | 12/1997 | Wheeler | 277/345 |
| 5,709,388 A | * | 1/1998 | Skinner et al. | 277/412 |
| 5,908,195 A | * | 6/1999 | Sharrer | 277/412 |
| 5,941,685 A | * | 8/1999 | Bagepalli et al. | 415/173.3 |
| 5,964,467 A | * | 10/1999 | Hirata | 277/447 |
| 5,971,400 A | * | 10/1999 | Turnquist et al. | 277/416 |
| 6,161,839 A | * | 12/2000 | Walton et al. | 277/590 |
| 6,196,550 B1 | | 3/2001 | Arora et al. | |
| 6,343,792 B1 | * | 2/2002 | Shinohara et al. | 277/355 |
| 6,364,316 B1 | * | 4/2002 | Arora | 277/355 |
| 6,431,550 B1 | * | 8/2002 | Tong | 277/346 |
| 6,565,094 B2 | * | 5/2003 | Wright et al. | 277/355 |

(Continued)

OTHER PUBLICATIONS

NASA, Pressure-Balanced, Low-Hysteresis Finger Seal Developed and Tested. Updated Apr. 24, 2000. http://www.grc.nasa.gov/WWW/RT/RT1999/50001/~proctor.html.

*Primary Examiner* — Vishal Patel
*Assistant Examiner* — L. Susmitha Koneru
(74) *Attorney, Agent, or Firm* — Dwayne E. Rogge; Schacht Law Office, Inc.

(57) ABSTRACT

The disclosed finger seals are designed to be operational under rotational velocity or a stationary condition. The contact surface of the finger seals is inclined in an axial direction. The rotational velocity of the bore does not affect the hydrodynamic lift and the finger seals can operate at any rotational speed, unlike prior finger seal where the hydrodynamic lift is generated by rotational velocity. Each finger seal is pressure balanced. The pressure chambers on the two sides of each finger seal are connected through the finger cutouts. The finger seal design is such that the fingers lift and move away from the bore surface in radial direction. In one form, each finger seal is designed with the specific required length to allow sufficient surface area for the hydrodynamic force such that the finger seals would be lifted from the bore surface at the design pressure.

9 Claims, 11 Drawing Sheets

(56) References Cited

U.S. PATENT DOCUMENTS

| | | | |
|---|---|---|---|
| 6,585,270 B2 * | 7/2003 | Tong | 277/346 |
| 6,655,696 B1 * | 12/2003 | Fang et al. | 277/409 |
| 6,695,316 B2 * | 2/2004 | Popa et al. | 277/411 |
| 6,736,401 B2 | 5/2004 | Chung et al. | |
| 6,932,349 B2 * | 8/2005 | Coppola | 277/409 |
| 6,991,235 B2 * | 1/2006 | Ebert et al. | 277/355 |
| 7,182,345 B2 * | 2/2007 | Justak | 277/355 |
| 7,410,173 B2 * | 8/2008 | Justak | 277/355 |
| 7,510,086 B2 * | 3/2009 | Henssler et al. | 210/400 |
| 7,538,464 B2 * | 5/2009 | Hemmi et al. | 310/90 |
| 7,604,239 B2 * | 10/2009 | Chitren et al. | 277/301 |
| 7,726,660 B2 * | 6/2010 | Datta | 277/411 |
| 7,726,940 B2 * | 6/2010 | Snowsill | 415/231 |
| 7,806,410 B2 * | 10/2010 | El-Aini et al. | 277/413 |
| 2003/0025274 A1 | 2/2003 | Allan et al. | |
| 2003/0111797 A1 * | 6/2003 | Chung et al. | 277/355 |
| 2004/0000760 A1 * | 1/2004 | Aksit et al. | 277/355 |
| 2004/0113367 A1 * | 6/2004 | Martins et al. | 277/412 |
| 2004/0155410 A1 | 8/2004 | Proctor et al. | |
| 2005/0098957 A1 * | 5/2005 | Goss et al. | 277/355 |
| 2005/0098958 A1 * | 5/2005 | Ebert et al. | 277/355 |
| 2006/0125190 A1 * | 6/2006 | Addis | 277/355 |
| 2006/0214378 A1 * | 9/2006 | Zheng | 277/355 |
| 2007/0063448 A1 * | 3/2007 | Kowalczyk | 277/355 |
| 2007/0096397 A1 * | 5/2007 | Justak | 277/355 |
| 2007/0252336 A1 * | 11/2007 | Grabeldinger | 277/355 |
| 2008/0008579 A1 * | 1/2008 | Mikulec | 415/170.1 |
| 2008/0029968 A1 * | 2/2008 | Addis | 277/355 |
| 2008/0107525 A1 * | 5/2008 | Adis et al. | 415/230 |
| 2008/0122183 A1 * | 5/2008 | Braun et al. | 277/355 |
| 2008/0136112 A1 * | 6/2008 | Addis | 277/355 |
| 2009/0194948 A1 * | 8/2009 | Wirt | 277/345 |
| 2010/0021247 A1 * | 1/2010 | Aldred et al. | 406/19 |
| 2011/0121519 A1 * | 5/2011 | Justak | 277/412 |
| 2012/0121411 A1 * | 5/2012 | Endo et al. | 415/229 |
| 2012/0299248 A1 * | 11/2012 | Cordiner et al. | 277/409 |
| 2012/0308367 A1 * | 12/2012 | Luczak | 415/173.1 |

* cited by examiner

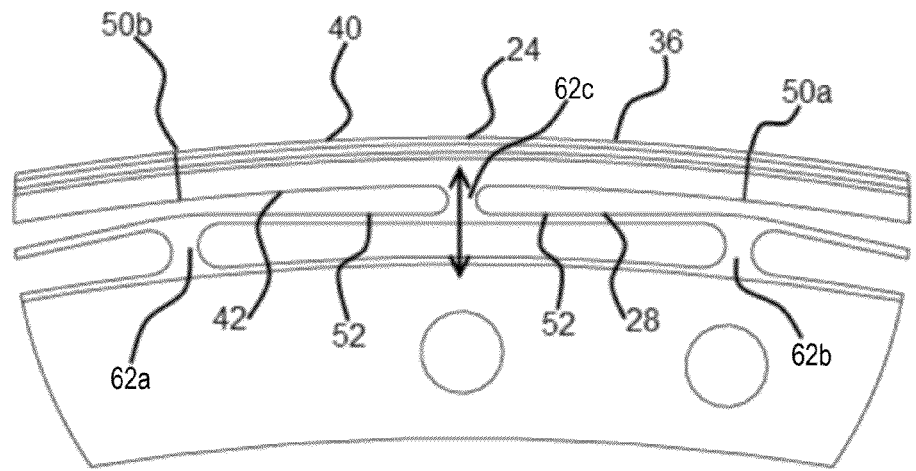
Fig. 12
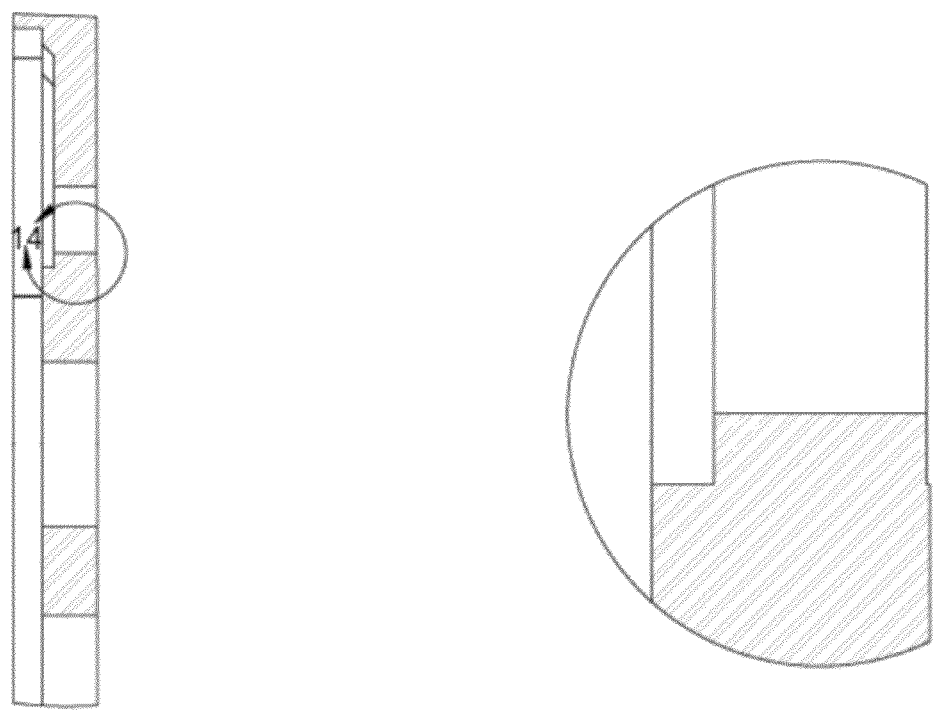
Fig. 13
Fig. 14

HYDRODYNAMIC BORE SEAL

RELATED APPLICATIONS

This application claims priority benefit of U.S. Provisional Ser. No. 61/183,846, filed Jun. 3, 2009.

BACKGROUND OF THE DISCLOSURE a) Field of the Disclosure

This disclosure relates to the field of hydrodynamic bore seals, and in particular to layered finger seals of a novel design and arrangement.

b) Background Art

Some examples of dry running seals to seal against leakage of a compressed gas include finger seals, brush seals and labyrinth seals. Typically, these seals are used in turbines, or other high-temperature, high-speed applications where lubricated seals or positive seals fail. Some examples of finger seals are described in patents such as US 2008/0122183, U.S. Pat. No. 6,196,550, U.S. Pat. No. 5,108,116, and U.S. Pat. No. 6,736,401.

In patent application US 2008/0122183 is disclosed hydrodynamic sealing pads comprising one or two taper angles, one taper angle in the direction of shaft speed (tangential) and the other taper angle in the axial direction. The taper in the tangential direction to rotation allows for an increasing hydrodynamic lift due to increasing RPM of the shaft being sealed. The taper in the axial direction results in a desirable lifting force due only to differential pressure. The two taper angles could be combined or used separately to create a more desirable operating range of RPMs and pressures for a given application.

SUMMARY OF THE DISCLOSURE

The disclosed finger seals are designed to be operational under rotational velocity or stationary conditions. The contact surface of the finger seals is inclined in an axial direction. This incline causes a convergent leakage path between the finger foot surface and the bore. Therefore, the leakage flow passing through this gap exerts hydrodynamic lift on the finger and lifts the finger from the bore surface at design pressure. Since the slope is in the axial direction, the rotational velocity of the bore does not significantly affect the hydrodynamic lift and the finger seals can operate at any rotational speed, unlike prior finger seals where the hydrodynamic lift is generated by rotational velocity.

Each finger seal is pressure balanced. The pressure chambers on the two sides of each finger seal are connected through the finger cutouts. The finger seal design is such that the fingers lift and move away from the bore surface in a radial direction. Therefore, the angle between the finger seal foot and the bore is constant at any lifted distance. In each seal stack up, in one form, each finger seal is designed with the specific required length to allow sufficient surface area for the hydrodynamic force, such that the finger seals would be lifted from the bore surface at the design pressure.

BRIEF DESCRIPTION OF THE DRAWINGS

FIG. 12 is a detail view of the region 12 of FIG. 10.

FIG. 13 is a detail view of the region 13 of FIG. 11.

FIG. 14 is a detail view of the region 14 of FIG. 13

DESCRIPTION OF THE PREFERRED EMBODIMENTS

The attached figures illustrate the design of an improved finger seal 20 and a preferred assembly embodiment. The seal 20, in this embodiment, is configured to seal inside of a bore, however, a similarly designed seal could be designed to seal on a shaft by inverting the features.

To ease in understanding, an alphanumeric number system will be used comprising numeric references to groups, such as the number 24 regarding a pad, and an alpha suffix referring to particular elements with the group, such as individual pads 24a and 24b.

Figure 9:
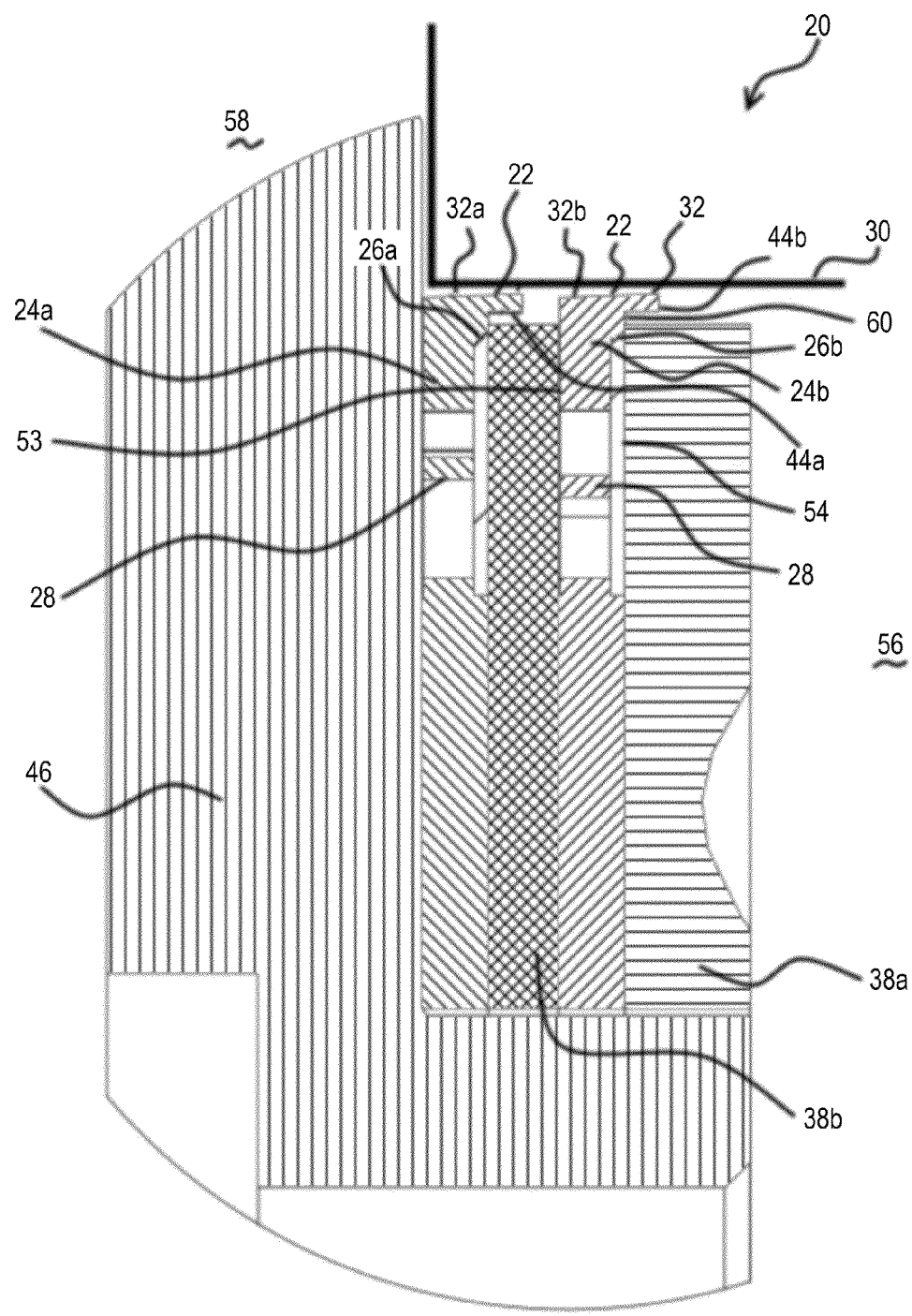
FIG. 9 is a detail view of the region 9 of FIG. 6.

The seal 20 comprises one or more sealing rings 26, as shown in FIG. 9, that rest up against one or more backing plates (seal holder) 46. Each of the sealing rings 26 is designed to have an "L" shape profile and a taper angle 22 on the sealing diameter 36 (see FIG. 12) of the sealing ring 26. There are a number of "pads" 24 on the outside diameter of each sealing ring 26 shown in the figures. The taper angle 24 is provided on the outside diameter of the seal pads 24 and each pad 24 tapers in the direction of the axis of rotation, or central axis of the circular seal. The principle of operation of the finger pads 24 is as follows: each pad 24 is supported by a spring structure 28, comprising a plurality of spring members, which can be more easily understood by looking to FIG. 12. The seal pads, in one form, are connected to each other and cannot move independent of the adjacent pads. One key advantage of this arrangement is that the spring understructure is designed such that the seal pad moves radially (linearly) and its angle between the bore or shaft surface stays constant as the sealing pad moves (lifts off from the bore or shaft surface). This spring under structure in this particular embodiment has a symmetric spring support structure (unlike finger seals in the patents listed previously which are spiral beams in shape) using a simple beam spring 52 design.

Under a differential pressure, the seal experiences a leakage over each pad 24 and through the gaps 50 between the sides of the pads, which are ideally laser-cut with a gap thickness that is very small, such as 2 or 3 thousandths of an inch. In another embodiment, the gap is minimized as much as possible. Most of the leakage typically occurs between the bore 30 and the tapered pad faces 32 rather than between the pads 24. A non-linear pressure drop occurs on the outside diameter of the pads. The difference in pressure between the outside 40 of the pads and the inside 42 of the pads 24 (see FIG. 12) creates a net lifting force away from the bore 30 so as to preferably lift the pads 24 and reduce or prevent sliding friction under certain differential pressures, in this particular embodiment. In one form, the length of the L-lip 44 (FIG. 9) is designed so as to provide the desired net lifting-force away from the bore 30—the longer the lip, the higher the net lift force will be. There is a designed spring pre-load interference between the pads 24 and the bore 30. The lifting force must come close to or overcome the preloading force in order to reduce or eliminate friction wear of the pads 24 on the bore 30. The spring force, in one form, shall be sufficient to overcome the axial friction of the seal and bore. The taper 22 on the outside of the pads 24 is used in order to better maximize the pressure along the outside of the pad 24. It can be shown that the taper produces a desirable differential pressure for lift, in contrast to prior, no taper designs.

In other words, the angled foot surface develops a converging channel for the leakage flow. The flow passing between the finger surface and bore or shaft pushes the finger away from the bore or shaft surface. This force is caused by the leakage passing underneath the finger and is independent of rotation speed. Therefore, the fingers will not touch the bore or shaft as there is a pressure differential between the high-pressure side 58 and low pressure side 56 of the seal. The fingers are I-shaped in one form to increase the surface area of the finger foot where the hydrodynamic lift is applied. In one form each finger seal is pressure balanced in the axial direction, the cutouts in the finger seal connect the two sides of the finger seals for pressure balancing. A lip feature 44 is designed at the inner angle of the L-shaped finger to seal the pressure balance chamber from the lower pressure side of the seal.

The cutouts in the finger seal connect the two sides of the finger seals for pressure balancing. As the fluid passes through the finger seals, the pressure decreases. Therefore, the pressure (hydrodynamic lift) applied to each finger foot is different than the other. Hence, each finger is designed with the required length to provide enough surface area for the lift force to lift the finger from the bore or shaft surface at the design pressure.

Figures 10, 11:
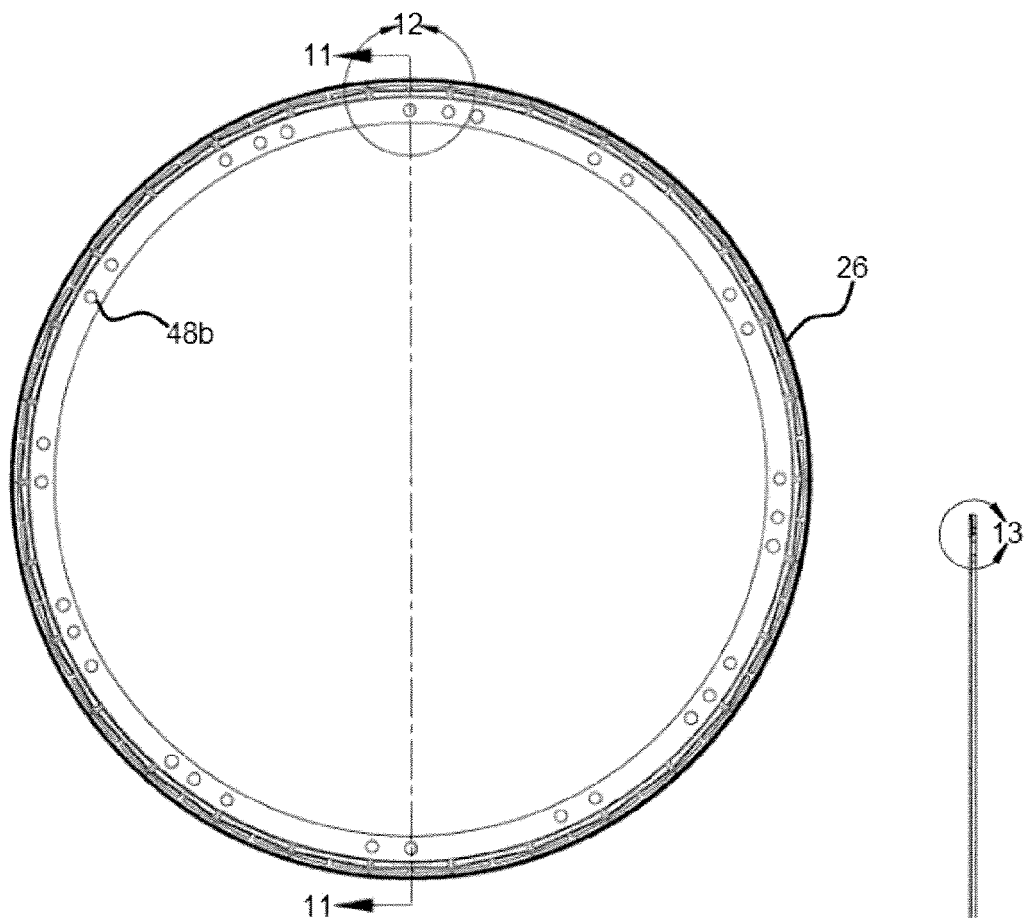
FIG. 10 is a front view of a compliant disk seal, in one form.
FIG. 11 is a side view of the compliant disk seal of FIG. 10.
Figures 15, 16:
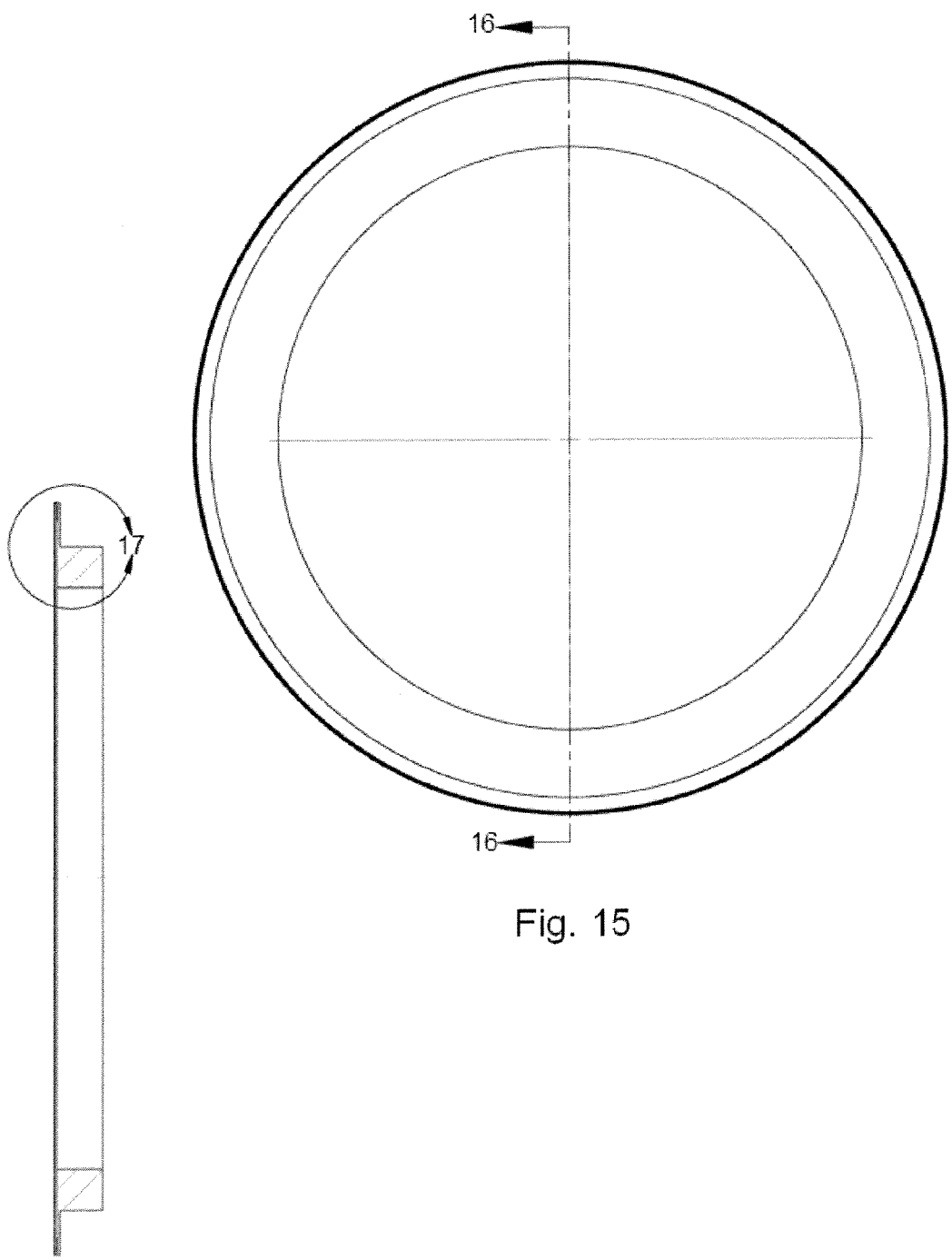
FIG. 15 is a front view of a compliant disk seal, in one form.
FIG. 16 is a side view of the compliant disk seal of FIG. 15.
Figure 17:
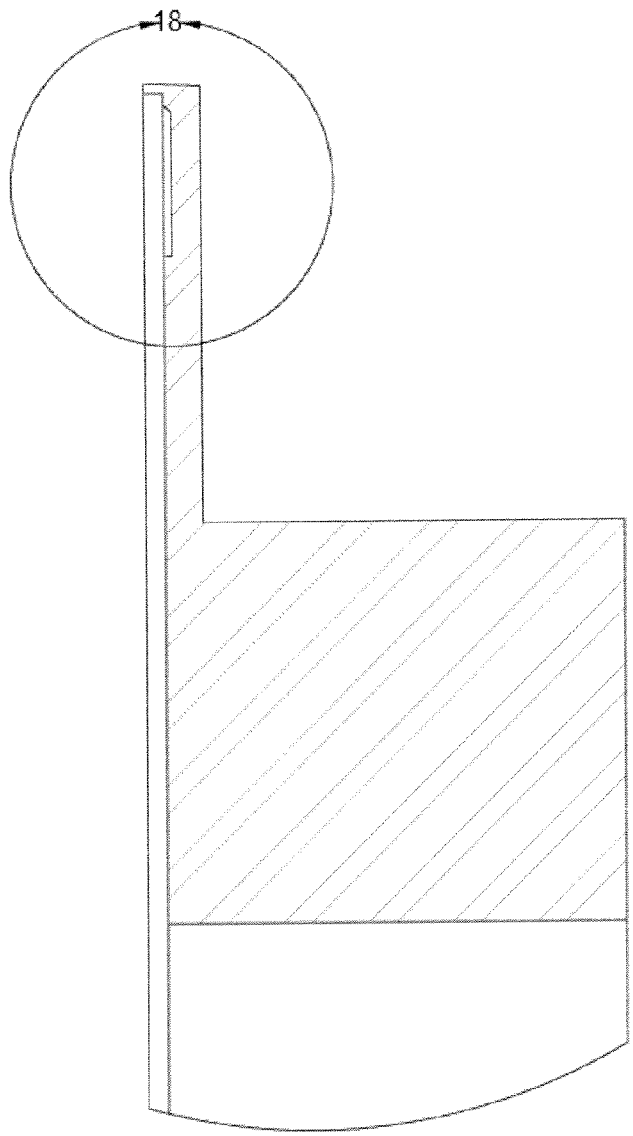
FIG. 17 is a detail view of the region 17 of FIG. 16.
Figure 18:
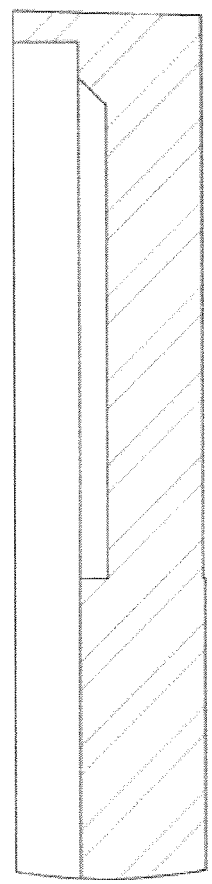
FIG. 18 is a detail view of the region 18 of FIG. 17.
Figure 19:
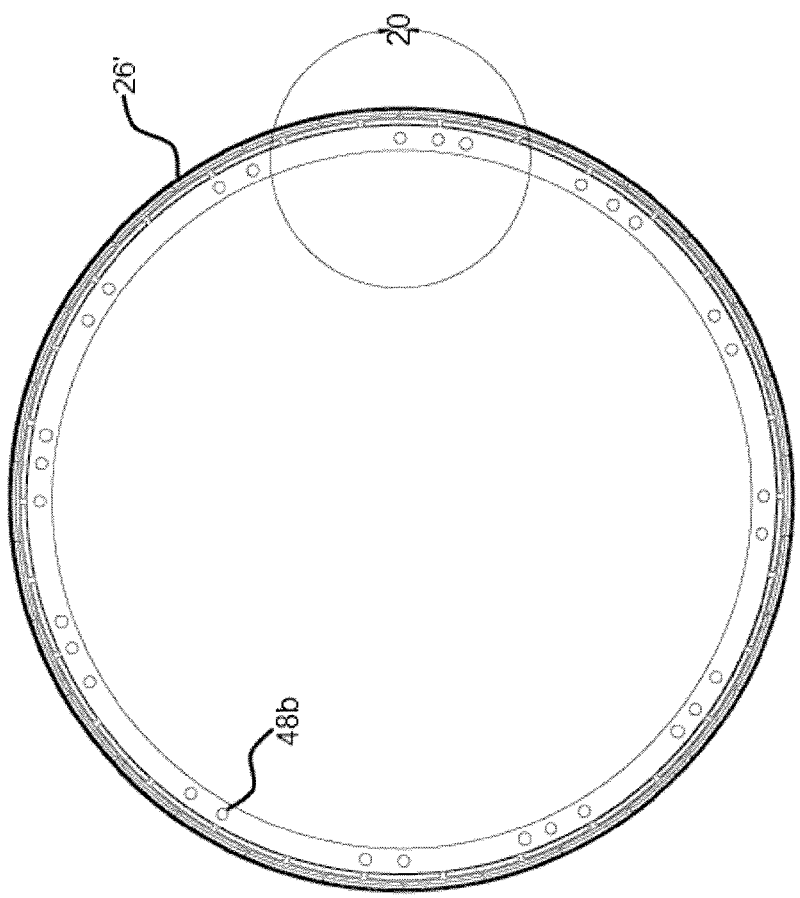
FIG. 19 is a front view of a compliant disk seal, in another form.

FIG. 19 shows a similar arrangement to that of FIG. 10, with the under spring structure substantially reversed in that a single brace 62' extends between the main structure and the beam springs 52' adjacent each pad 24', and a plurality of braces 62' extends between the beam springs 52' and each pad 24' on the ends thereof.

Figure 20:
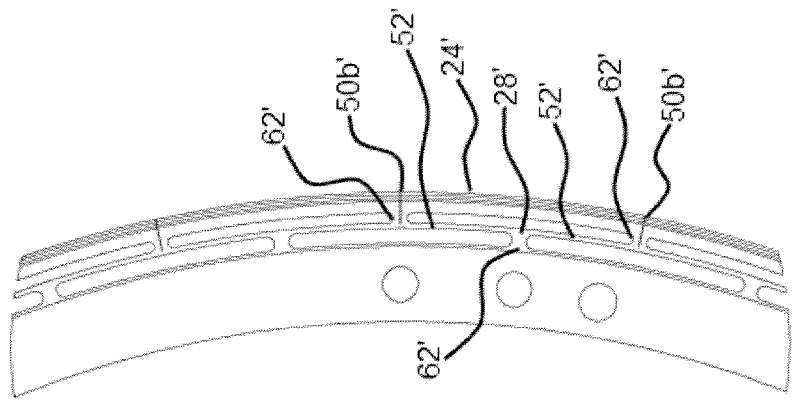
FIG. 20 is a detail view of the region 20 of FIG. 19

The embodiment shown in FIG. 20 also utilizes gaps 50b', which do not extend through the entire pad 24' but rather function as a living hinge type structure to maintain relative position therebetween.

In operation, there is a net axial force that acts on the pads 24 due to differential pressure. The hydrodynamic force should also overcome this axial sliding friction between pads 24 and backup plates 38, in order to allow the pads 24 to comply to the bore 30 if there is changing eccentricity of the bore 30 with respect to the seal 26. To minimize this axial frictional force, the L-shaped lip 44 is designed to be as thin as reasonably possible for strength and machineability, and the gap between the lips and the outside diameter of the backup plates 38 is minimized. This design results in a net pressure-area that is minimized. Each finger seal is pressure balanced. The gaps between the seal ring and the spacer are connected through the spring cutouts in the seal structure. Therefore, the two sides of the seal are at the same pressure and the seal is pressure balanced. To achieve this, the thickness of the finger seal is smaller than the space between the two adjacent spacers, such that the finger has some clearance, gaps 53 and 54, from the two spacers, plates 38a and 38b when the seal ring 26b is sandwiched in between. Fluid fills these gaps and since the gaps on the two sides are connected through the cutouts in the finger seal structure, they are the same pressure. Therefore, little axial load is applied on the finger seal structure. The upstream gap 53 and downstream gap 54 are shown in FIG. 9. To prevent leakage from the downstream gap 54 to the low-pressure region 56 from the high-pressure region 58, a lip 60 is provided on the finger seal that rests on the backup plate 38a and effectively seals the gap 54 chamber from the downstream low-pressure region 56. The compliant spring loaded sealing rings are pressure balanced axially to allow the pads 24 to slide in and out more freely, in order to allow them to be more compliant under eccentricities (such as due to thermal expansion, centrifugal expansion of the bore, startup and shutdowns, vibration, or out of tolerance parts rotating, to list a few examples). The underlying spring structure 28 under the pads 24 is designed to be stiff enough so as to be able to overcome the axial frictional forces, so as to allow for the compliance under eccentricities, but the underling spring structure 28 is also designed to be relatively thick and strong (or rather not very fragile) so as to be robust under high vibration applications, such as in automotive engines, for example. This design is therefore possibly less fragile than prior "finger seal" designs.

This particular embodiment has a taper angle 22 in the axial direction in order to create a hydrodynamic lift due only to leakage flow due to differential pressure. In another embodiment, another taper angle could be added in the circumferential direction so as to create a compound angle in two planar directions. This could be designed to result in hydrodynamic lift from both differential pressure in the axial direction, as well as hydrodynamic lift caused from rotation of the bore with respect to the seal pads, as disclosed in US patent application 2008/0122183. That is, the lifting force could be designed for specific differential pressures and specific ranges of revolutions per minute (RPMs) of the bore 30 being sealed. Particularly with sealing against liquids, this rotational hydrodynamic lift is not negligible. Another embodiment could be such that the seal pad 24 is designed to have only a circumferential hydrodynamic lifting force and zero lifting force due to pressure differential/axial leakage flow. Typically, this design would be good for lower differential pressures and higher rotational speeds.

The type of material used for this compliant seal depends on the pressures, temperatures, and expected frictional forces on the pad faces, as well as pressure loads acting on the backup plates. Metals, such as stainless steel, spring steel etc., could be utilized. Surface coatings could be applied to the materials in order to reduce friction, and material hardness or composition could be changed to provide desirable temperature, strength or friction properties.

In prior art finger seals listed previously, the seals generally comprise a supporting spring structure that is spiral in shape. As the spring deflects, the angle that the finger's pad makes with the sealing surface tilts and changes, causing a change (increase) in the leakage gaps under the finger pads 24. For the present invention where there is not necessarily a designed tilt in the tangential direction for conditions where we do not desire a hydrodynamic lift force due to rotation but only due to differential pressure, this tilting of the pad 24 due to the spring deflection under preload or lift force is not desirable and can increase leakage.

In the present invention, a sturdy pad and spring design is disclosed that is robust under severe operating conditions. This configuration is unique to finger seal designs as this configuration utilizes large pads 24 and a strong spring structure 28, among other properties. A robust, strong design using the prior finger seal approach would require the finger beams to be short and the pads long, accentuating the tilting effect due to lifting of the pads, therefore creating larger gaps under the pads and higher leakage. As a result in the disclosed embodiments, a symmetric design is utilized to substantially eliminate the tilting effect. In the disclosed embodiments, there is no taper angle in the transverse direction of the pads. All leakage should therefore be through the side gaps, under the pads from hydrodynamic lift, or surface inconsistencies under the pads and bore, not due to tilting effects of the pads or taper in the transverse direction.

In the assembly FIG. 9 of the disclosed embodiments, shown are two sealing pad rings 26 and two backup support plates 38. The pads 24 are staggered in order to create a circuitous path and maximize pressure drop from leakage that occurs between the pads 24. Layering the pads as shown also reduces the forces acting on each sealing ring 26, so any number of sealing rings 26 and backup plates 38 could be stacked together. The benefits of this arrangement could be to reduce the forces or requirement for robustness of each layer (sealing ring/backup plate combination), or increasing the number of layers can decrease leakage by creating a more circuitous path for the leakage, for example. In one form, shown in FIG. 8, adjacent pads 24a and 24b having offset gaps such that adjacent gaps 50a and 50b defining a pad 24a do not overlap the gaps 50c or 50d in the adjacent pad 24b of adjacent sealing rings.

Figure 1:
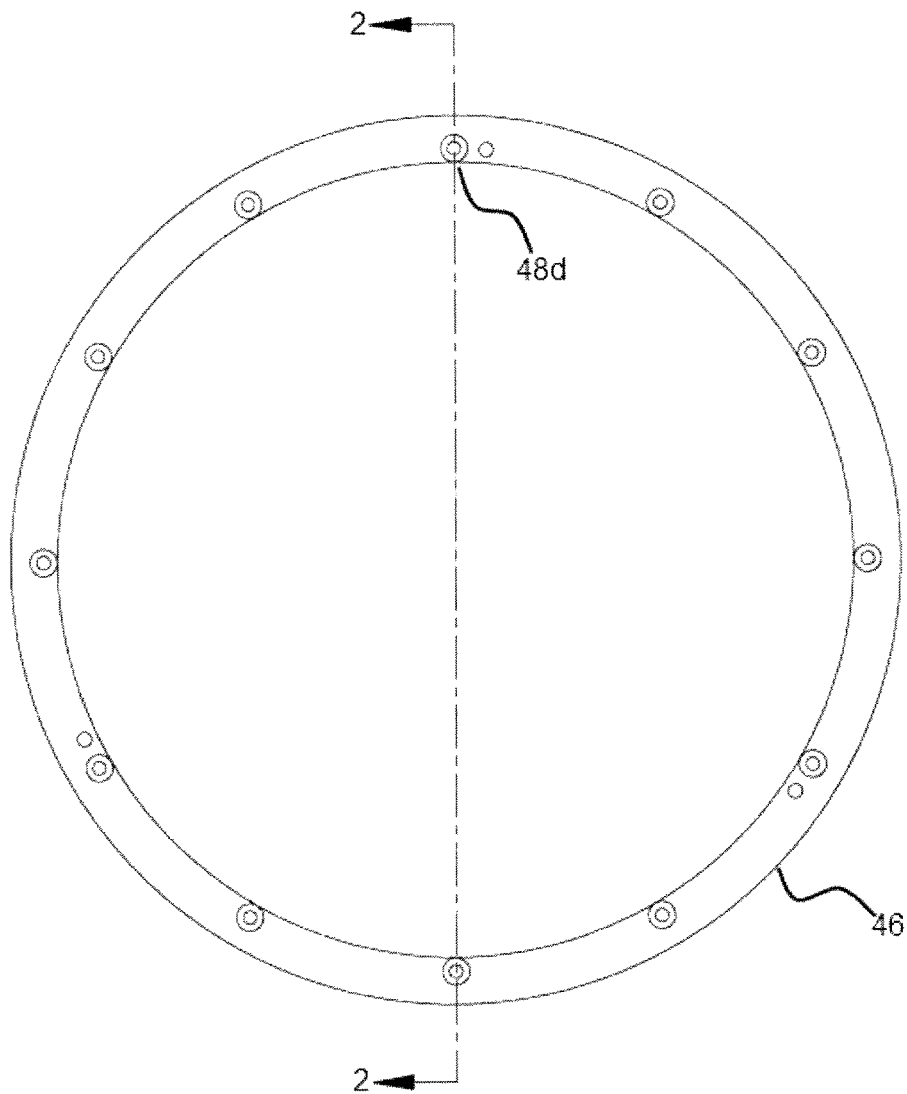
FIG. 1 is a front view of a compliant seal rear plate, in one form.
Figure 2:
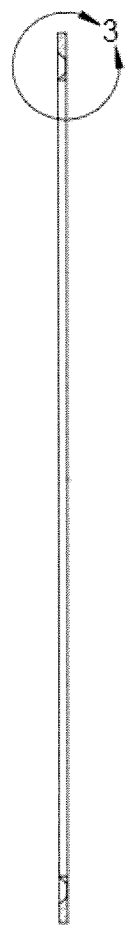
FIG. 2 is a side view of the compliant sear rear plate shown in FIG. 1.
Figure 3:
FIG. 3 is a detail view of the region 3 of FIG. 2
Figure 4:
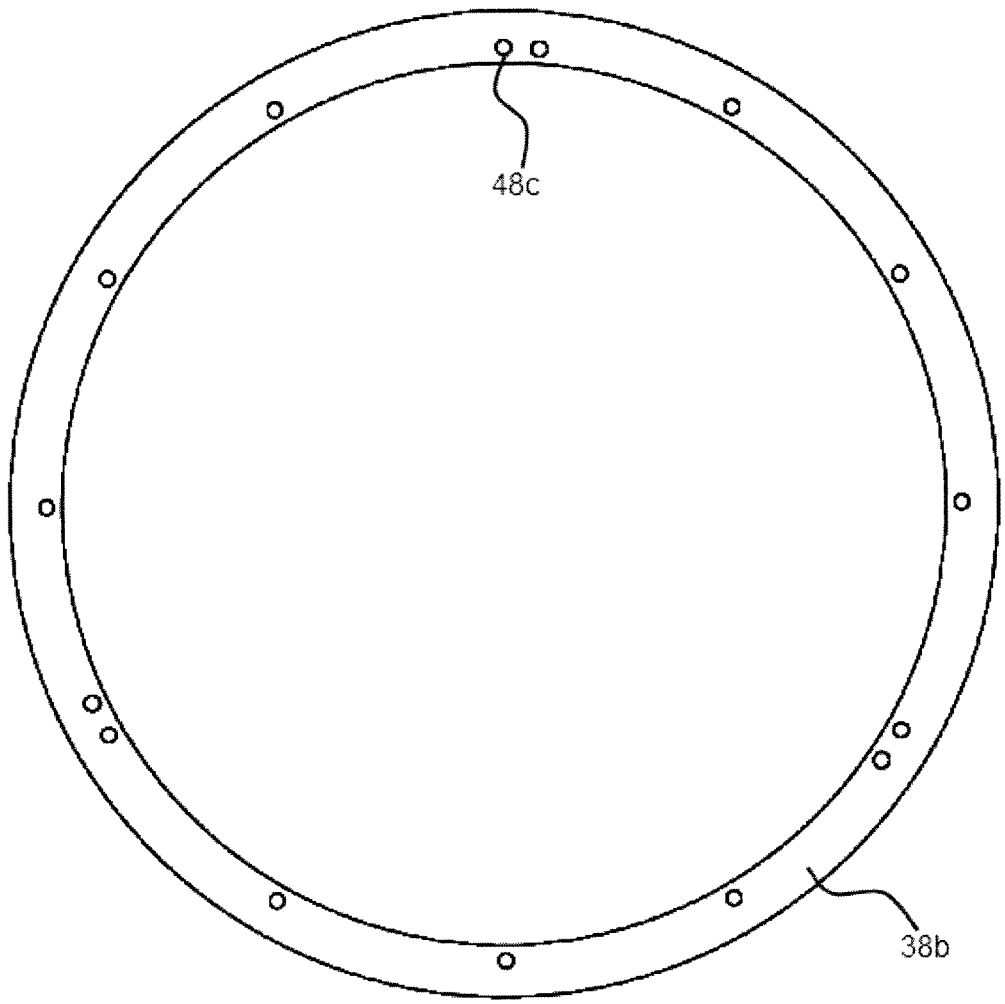
FIG. 4 is a front view of a compliant seal middle plate, in one form.
Figure 5:
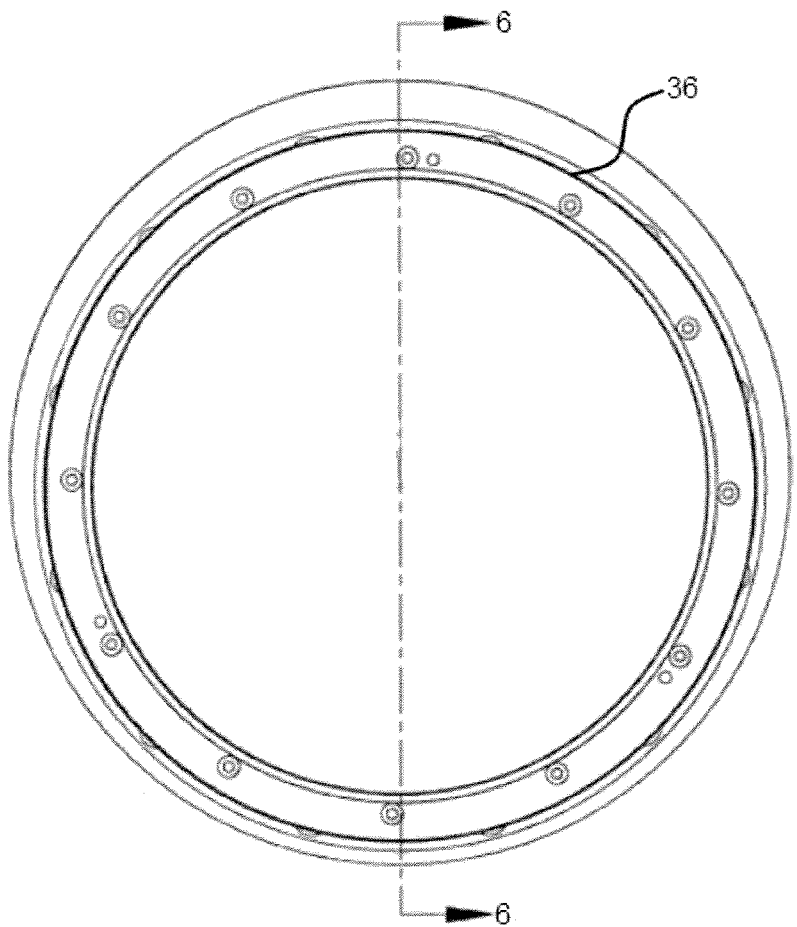
FIG. 5 is a front view of a seal assembly, in one form.
Figure 6:
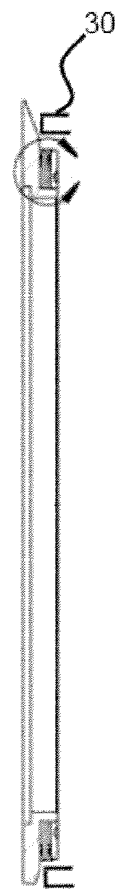
FIG. 6 is a side view of the seal assembly of FIG. 5.
Figure 7:
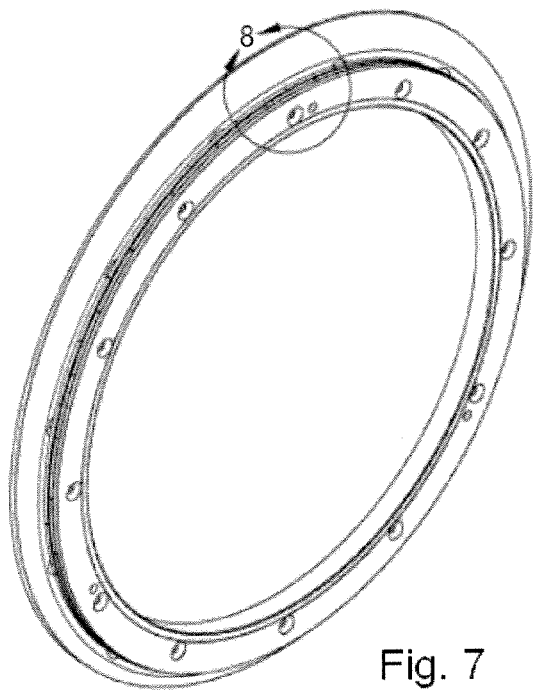
FIG. 7 is an isometric view of the embodiment shown in FIG. 5.
Figure 8:
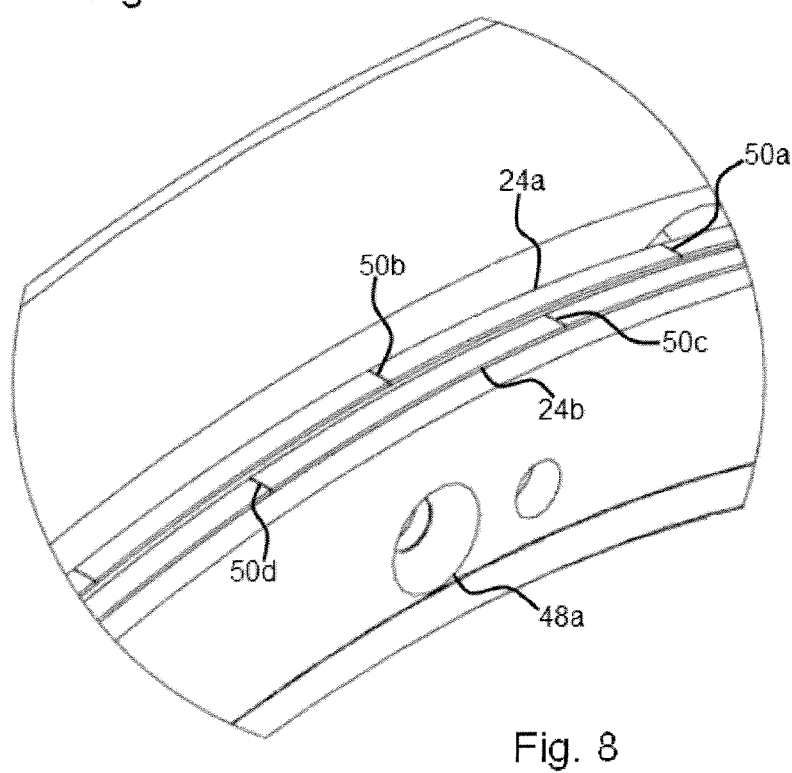
FIG. 8 is a detail view of a region 8 of FIG. 7.

In one form, all plates and sealing rings are attached to the seal holder 46. Bolts may be passed through voids 48. For example, voids 48a (in the outer backing plate 38a as shown in FIG. 8), 48b in each compliant disk seal (sealing ring 26 of FIG. 10), 48c (in the middle plate 38b of FIG. 4), 48d (in the rear plate 46 of FIG. 1) etc. could be aligned when assembled.

In one form, the outer backing plate 38a is thicker than the middle backing plate 38b resulting from analysis that a higher differential pressure occurs on the last seal and therefore there is a larger axial force acting on the outer backing plate 38a.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A sealing assembly for a bore or shaft, the sealing assembly comprising:
   a. a ring shaped seal holder;
   b. at least one sealing ring having a main body, the sealing ring adjacent the seal holder and attached thereto;
      i. wherein each sealing ring comprises a plurality of adjacent sealing pads having a surface configured to engage a bore or shaft;
      ii. wherein each sealing pad has a first circumferential end portion, a second circumferential end portion, and a middle circumferential portion;
      iii. wherein each sealing ring comprises a spring structure coupling each sealing pad to the main body of the sealing ring;
      iv. wherein each spring structure comprises a radially extending first brace connected to the main body at a first circumferential location and a radially extending second brace connected to the main body at a second circumferential location extending from the main body of the sealing ring to the bore or shaft,
      v. wherein a beam spring is connected to and bridges the first brace and second brace and the beam spring extends circumferentially between the radially extending first brace and radially extending second brace;
      vi. wherein a third brace extends radially from and is connected to the beam spring between the first brace and the second brace and is connected to a circumferential median portion of the sealing pad; wherein the spring structure biases the associated sealing pad towards the bore or shaft linearly away from the main body of the sealing ring; and
   c. a forward backing plate adjacent a sealing ring and positioned opposite the sealing ring relative to the seal holder.

2. The sealing assembly as recited in claim 1 wherein each sealing ring, and the forward backing plate are coupled to the sealing holder and configured to rotate therewith relative to the bore or shaft.

3. The sealing assembly as recited in claim 1 further comprising gaps between adjacent sealing pads which do not extend radially through the entire pad so as to form a living hinge type structure to maintain relative position between adjacent sealing pads.

4. The sealing assembly as recited in claim 1 wherein the sealing pads are tapered parallel to the axial direction.

5. A sealing assembly for a bore or shaft, the sealing assembly comprising:
   a. a ring shaped seal holder;
   b. at least one sealing ring having a main body, the sealing ring adjacent the seal holder and attached thereto;
      i. wherein each sealing ring comprises a plurality of adjacent sealing pads having a surface configured to engage a bore or shaft;
      ii. wherein each sealing ring comprises a radially extending spring structure coupling each sealing pad to the main body of the sealing ring;
      iii. wherein each spring structure comprises a radially extending first brace connected to the main body at a first circumferential location and a radially extending second brace connected to the main body at a second circumferential location extending from the main body of the sealing ring toward the sealing pad,
      iv. wherein a beam spring is connected to and bridges the first brace and second brace and the beam spring extends circumferentially between the radially extending first brace and radially extending second brace;
      v. wherein a third brace extends radially from and is connected to the beam spring between the first brace and the second brace to a circumferential median portion of the sealing pad;
      vi. wherein each sealing pad is L-shaped in cross section, such that the sealing pad is substantially thicker adjacent the bore or shaft than a portion distal from the bore or shaft; and
   c. a forward backing plate adjacent a sealing ring and positioned opposite the sealing ring relative to the seal holder.

6. The sealing assembly for a bore or shaft as recited in claim 5 further comprising:
   a. a plurality of sealing rings, b. wherein at least two of the plurality of sealing rings are of unique configuration from one another.

7. The sealing assembly for a bore or shaft as recited in claim 6 wherein the differences between the sealing rings are selected from the set consisting of:
   a. rigidity;
   b. material;
   c. I-section profile; and
   d. thickness.

8. The sealing assembly for a bore or shaft as recited in claim 5 further comprising:
   a. a lip provided on the sealing pad;
   b. the lip in contact with the forward backing plate;
   c. wherein the lip is configured to effectively seal a high pressure region on a first side of the sealing assembly from a low pressure region on a second side of the sealing assembly.

9. The sealing assembly for a bore or shaft as recited in claim 5 wherein the sealing pads are tapered perpendicular to the axial direction.

* * * * *